United States Patent [19]

Hoge et al.

[11] Patent Number: 5,447,806
[45] Date of Patent: Sep. 5, 1995

[54] GAS-TIGHT SEALED NICKEL/HYDRIDE BATTERY

[75] Inventors: Detlev Hoge, Gifhorn; Uwe Kohler, Kelkheim, both of Germany

[73] Assignee: Varta Batterie Aktiengesellschaft, Hanover, Germany

[21] Appl. No.: 194,067

[22] Filed: Feb. 9, 1994

[30] Foreign Application Priority Data

Feb. 24, 1993 [DE] Germany .............. 43 05 560.5

[51] Int. Cl.⁶ .................. H01M 2/16; H01M 4/80
[52] U.S. Cl. ..................... 429/59; 429/128; 429/235; 429/246
[58] Field of Search ............ 429/59, 128, 235, 246

[56] References Cited

U.S. PATENT DOCUMENTS

| | | | |
|---|---|---|---|
| 711,481 | 10/1902 | Daboll | 429/235 X |
| 3,351,490 | 11/1967 | Van Doehren | 429/59 |
| 4,687,719 | 8/1987 | Von Benda et al. | 429/235 X |

FOREIGN PATENT DOCUMENTS

| | | |
|---|---|---|
| 1671972 | 3/1972 | Germany . |
| 2838857 | 3/1979 | Germany . |
| 4017919 | 12/1991 | Germany . |
| 2-216766 | 8/1990 | Japan .............. H01M 4/80 |

*Primary Examiner*—Stephen Kalafut
*Attorney, Agent, or Firm*—Weiser & Associates

[57] ABSTRACT

A gas-tight nickel/hydride battery with a high oxygen consumption rate and a correspondingly low internal pressure has a stacked arrangement of positive and negative electrodes wherein the negative electrodes are divided in two with a coarse supporting framework as a space between the resulting partial electrodes. Gas impermeable microporous separators deflect the oxygen stream emerging from the positive electrodes to faces of the negative partial electrodes. The spacer provides an inner space with walls defining an enlarged area for reducing the deflected oxygen stream. Because the micropores are completely filled with electrolyte due to their capillary activity, the microporous separators also permit the construction of nickel/hydride batteries with cell heights which could not otherwise be achieved in alkaline batteries with nonwoven fabric separators.

14 Claims, 1 Drawing Sheet

GAS-TIGHT SEALED NICKEL/HYDRIDE BATTERY

BACKGROUND OF THE INVENTION

This invention generally relates to a nickel/hydride battery with positive electrodes of nickel-hydroxide and with negative electrodes of a hydrogen storing alloy, stacked in a gas-tight housing with alternating polarities.

Similar to gas-tight nickel/cadmium batteries, the gas-tight operation of a nickel/hydride battery presumes the continuous removal of oxygen formed during the transfer of charge to the positive electrode. The amount of oxygen formed depends heavily on the conditions of charging and discharging, the temperature, the composition of the electrolyte and cell balance. In equilibrium, the charging current is fully consumed at a set oxygen pressure. This oxygen pressure is set under certain operating conditions and for a certain equalization rate for the electrodes.

Since the negative electrode is over-sized relative to the positive electrode, even after being fully charged, the positive electrode will still contain a negative charge reserve. Likewise, upon complete discharge of the cell, the negative electrode will remain partially charged, as a negative discharge reserve. This assures that in the event of overcharging or over-discharging, discharging, oxygen or hydrogen, respectively, will be evolved only on the positive nickel electrode. Such gases must then be decomposed on the surface of the negative electrode, at that electrode's potential.

By way of example, such decomposition may be accomplished electrochemically, according to the equation

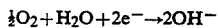

$$\tfrac{1}{2}O_2 + H_2O + 2e^- \rightarrow 2OH^-$$

or by chemical combination of the oxygen with stored hydrogen ($H_{st}$), according to the equation

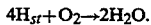

$$4H_{st} + O_2 \rightarrow 2H_2O.$$

In either case, it is important that the removal of such gas (especially of the oxygen) take place as rapidly as possible so that no impermissibly high gas pressure, and no oxy-hydrogen gas can form in the interior of the cell.

German Patent 1,671,972 discloses a gas-tight alkaline battery in which the area of the negative electrode is enlarged by dividing the electrode in two, so that the resulting (partial) electrodes lie side by side. A frame-like spacer is positioned between the partial electrodes, developing a gas consumption space between the partial electrodes. Passageways are provided for receiving gases for delivery to the gas-consumption space so that oxygen gas evolving from the neighboring positive electrodes can rapidly react on the walls of the partial electrodes.

German Patent 2,838,857 discloses a metal oxide/lanthanum nickel hydride storage cell in which oxygen is reduced by an auxiliary electrode which is in electron contact with the negative electrode, in each case inside the electrode stack but spatially separated from it. The disclosed electrode arrangement has two different types of separators. Coarse porous hydrophobic separators are in each case located between positive electrodes and auxiliary electrodes, and assure the access of oxygen to the auxiliary electrodes. Hydrophilic separators with low gas permeability are located between the positive and negative electrodes, to protect the negative electrodes against direct contact with oxygen.

SUMMARY OF THE INVENTION

It is the object of the present invention to provide a gas-tight nickel/hydride battery that can promote gas consumption on the negative electrode without impairing the overall function of the electrodes.

It is also the object of the present invention to provide a gas-tight nickel/hydride battery in which gas consumption on the negative electrode can take place at a high reaction rate while the internal pressure of the cell remains at a low level, even during a long overcharging phase.

These and other objects that will become apparent are achieved in accordance with the present invention by providing a nickel/hydride battery with positive electrodes of nickel hydroxide and with negative electrodes of a hydrogen-storing alloy stacked in a gas-tight housing with alternating polarities, wherein the negative electrodes are divided in two, and an intermediate layer of a coarse-pored material defines the distance between the divided (partial) electrodes, lying side by side. Each negative electrode is further insulated against neighboring positive electrodes by gas-impermeable separators. It has been found that a stacked arrangement of electrodes produced in accordance with tile present invention satisfies the above-mentioned requirements.

For further detail regarding the battery of the present invention, reference is made to the discussion which is provided below, in conjunction with the following illustrations.

DETAILED DESCRIPTION OF A PREFERRED EMBODIMENT

Figure 1:
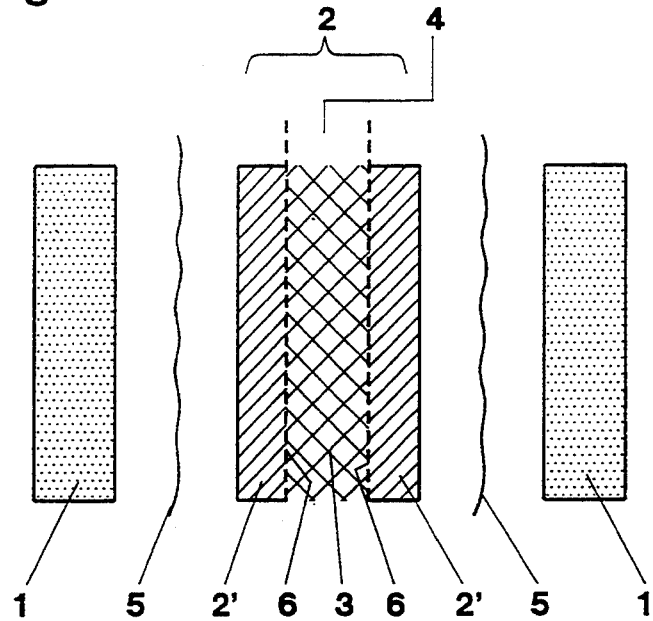
FIG. 1 schematically illustrates an electrode and separator arrangement in a nickel/hydride battery produced in accordance with the present invention.

FIG. 1 schematically shows positive electrodes 1 and negative electrodes 2 which alternate with one another and which are separated by separators 5 which are impermeable to gas. Each negative electrode 2 is comprised of two partial electrodes 2', each including an inwardly disposed electrode face which is easily accessible to oxygen. A spacer 3 occupies an intervening space 4 of a defined width between the partial electrodes 2'. The spacer 3 can be a coarse supporting frame or an open-pored structure formed of a metal foam or plastic material, and which is electrochemically inactive.

The separators 5 are preferably microporous membranes which, because of the high capillary activity of their pore system, are totally filled with electrolyte. This, in turn, has the effect of essential gas impermeability. As a result, oxygen coming to the outer faces of the negative electrode 2 is directed by the partial electrodes 2' into the intermediate space 4, where the inner walls of the partial electrodes 2' offer an enlarged reaction area.

In a preferred embodiment of the invention, the partial electrodes 2' are provided with current conducting carrier frames 6 (e.g., nickel nets). The carrier frames 6 lie opposite one another, on both sides of the intermediate space 4 (as shown in FIG. 1). Preferably, the carrier frames 6 form an integral unit with the spacer 3 occupying the intermediate space 4, and are also electrochemically inactive.

As an alternative, the negative electrode 2 can be implemented entirely with a metal foam carrier. By providing a metal foam carrier of sufficient thickness, an active material in the form of a hydrogen-storing alloy can be introduced (by suspending or adhering) on both sides of the foam carrier structure, to a desired depth, so that the gas consuming space 4 is formed as a pore zone which is not filled with active material (in the interior of the metal foam carrier).

As a further alternative, the negative partial electrodes 2' can be produced by a rolling process such as is described in German Offenlegungsschrift 4,017,919. In this case, a dry powder mixture is used which is composed of a metal or a metal alloy capable of storing hydrogen, an addition of the same metal or metal alloy in hydride form (as a charging/discharging reserve) and a plastic binder. This mixture is rolled out on a fine mesh metal net or expanded metal grid, as a support.

By suitable selection and dosing of the binder, the electrode material can be made hydrophobic in such a way that three-phrase boundaries are formed which can support both desired electrochemical reactions from the liquid phase, as well as optimum reactions from the gas phase. A hydrophobic behavior of the hydride electrodes is critical in terms of the ability to not only absorb oxygen, but also to absorb hydrogen gas which is formed in the event of a polarity reversal on the positive electrode (and which must then be absorbed by the partial electrodes so that recombination can take place).

The use of microporous gas-impermeable separators in accordance with the present invention has a particular advantage for nickel/hydride batteries. Because of their absorption capacity, the micropores are constantly filled with electrolyte. What is more, this electrolyte is reliably retained in the micropores, even in the case of a high-profile blank for the separator (in its upper region). Because of the enhanced capillary forces in such separators, it becomes possible to construct nickel/hydride batteries with considerably larger cell heights than could previously have been realized with rechargeable alkaline systems having conventional coarse-pored nonwoven fabric separators. For example, while the height of conventional cells is generally 10 to 15 cm, twice this height should be attainable with the microporous separators of the present invention.

Figure 2:
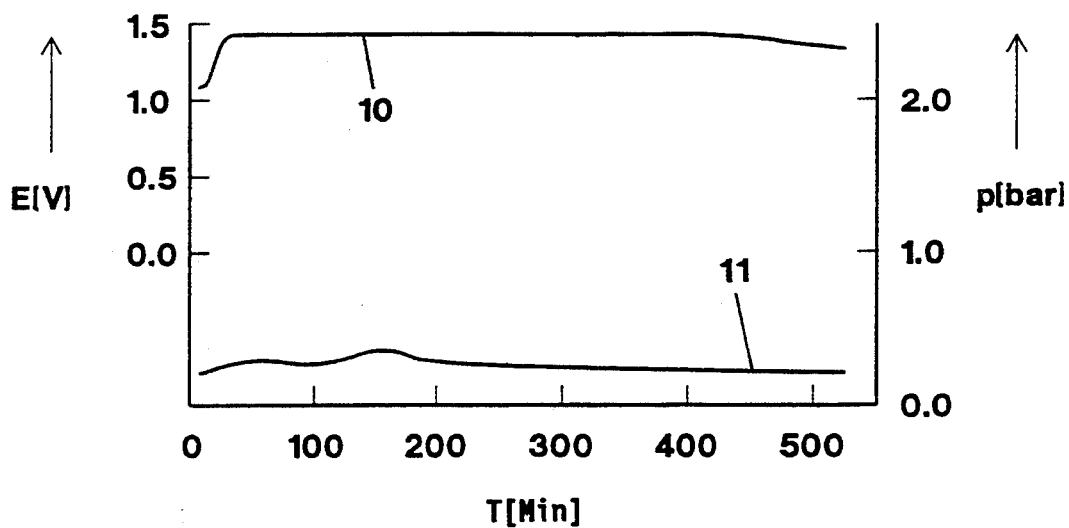
FIG. 2 is a graph showing voltage behavior and internal pressure of the nickel/hydride battery of the present invention.

In terms of performance, FIG. 2 shows curves representing the voltage (curve 10, E in volts) and the internal pressure (curve 11, p in bar) of a test cell produced in accordance with the present invention. The test cell was subjected to an overcharging lasting more than 500 minutes, with a 10-hour charging current. The success of the improvements of the present invention (i.e., enlargement of the area of the negative electrode by dividing it in two and favorably deflecting the oxygen stream to its consumption site by gas-impermeable separators) is confirmed by the uniform horizontal progression of the voltage curve 10, and in particular, by maintenance of the pressure curve 11 at a low level of less than 1 bar (absolute).

It will be understood that various changes in the details, materials and arrangement of parts which have been herein described and illustrated in order to explain the nature of this invention may be made by those skilled in the art within the principal and scope of the invention as expressed in the following claims.

What is claimed is:

1. A nickel/hydride battery including positive electrodes of nickel hydroxide and negative electrodes of a hydrogen-storing alloy stacked in a gas-tight housing with alternating polarities, wherein the negative electrodes are comprised of two partial electrodes and an intermediate spacer defining a distance between the two partial electrodes, and wherein each of the negative electrodes is insulated from neighboring positive electrodes by gas-impermeable separators.

2. The nickel/hydride battery of claim 1 wherein the negative electrodes have hydrophobic properties.

3. The nickel/hydride battery of claim 1 wherein the partial electrodes include current conducting support frames.

4. The nickel/hydride battery of claim 3 wherein the support frames are positioned on faces of the partial electrodes facing toward the spacer.

5. The nickel/hydride battery of claim 4 wherein the support frames and the spacer form an integral unit.

6. The nickel/hydride battery of claim 1 wherein the spacer is formed of a plastic.

7. The nickel/hydride battery of claim 1 wherein the spacer is formed of a metal foam.

8. The nickel/hydride battery of claim 1 wherein the spacer is a supporting frame.

9. The nickel/hydride battery of claim 1 wherein the spacer is an open-pored element.

10. The nickel/hydride battery of claim 9 wherein the partial electrodes are integral with the open-pored element.

11. The nickel/hydride battery of claim 10 wherein the partial electrodes are active masses contained in pores of the open-pored element, and wherein the pores of the open-pored element which contain the active masses are separated by a region including pores of the open-pored element which do not contain active mass.

12. The nickel/hydride battery of claim 1 wherein the partial electrodes are a roll-formed dry powder mixture.

13. The nickel/hydride battery of claim 12 wherein the dry powder mixture includes a metal or a metal alloy capable of storing hydrogen, an addition of the same metal or metal alloy in hydride form, and a plastic binder.

14. The nickel/hydride battery of claim 1 wherein the separators are formed of a microporous material.

* * * * *